US012624701B2

(12) United States Patent
Cheng et al.

(10) Patent No.: US 12,624,701 B2
(45) Date of Patent: May 12, 2026

(54) FAN WITH LIGHTING EFFECT

(71) Applicant: Razer (ASIA-PACIFIC) PTE LTD., Singapore (SG)

(72) Inventors: Cheng Yu Cheng, Singapore (SG); Fu Mei Wang, Singapore (SG); Chung Yun Huang, Singapore (SG); Shen Chen Hsiao, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 18/730,101

(22) PCT Filed: Apr. 13, 2022

(86) PCT No.: PCT/SG2022/050218
§ 371 (c)(1),
(2) Date: Jul. 18, 2024

(87) PCT Pub. No.: WO2023/200393
PCT Pub. Date: Oct. 19, 2023

(65) Prior Publication Data

US 2025/0146493 A1 May 8, 2025

(51) Int. Cl.
*F04D 19/00* (2006.01)
*F04D 29/00* (2006.01)
(Continued)

(52) U.S. Cl.
CPC ......... *F04D 19/002* (2013.01); *F04D 29/005* (2013.01); *F04D 29/522* (2013.01);
(Continued)

(58) Field of Classification Search
None
See application file for complete search history.

(56) References Cited

U.S. PATENT DOCUMENTS 6,507,159 B2 1/2003 Muthu
6,679,771 B2 1/2004 Lee
(Continued)

FOREIGN PATENT DOCUMENTS

CN 201661493 U 12/2010
CN 205263735 U 5/2016
(Continued)

OTHER PUBLICATIONS

Li et al (TW-M567815-U) + machine translation (Year: 2018).*
(Continued)

*Primary Examiner* — Juan G Flores
(74) *Attorney, Agent, or Firm* — Polsinelli PC

(57) ABSTRACT

In some aspects, a fan with lighting effect includes a fan blade assembly, a fan frame, a light emitting module, a reflector and a light guide. The fan frame has a periphery structure radially disposed to surround the fan blade assembly, the periphery structure having an inner wall and an outer wall defining a slot therebetween. The light emitting module is disposed in the slot and oriented to emit light along a light path non-parallel with the rotational axis of the fan blade. The reflector is disposed in the slot and in the light path of the light emitting module for reflecting the light emitted by the light emitting module. The light guide is fitted to the slot in a manner to guide light to exit from the slot via the slot opening.

19 Claims, 9 Drawing Sheets

(51) Int. Cl.

| | |
|---|---|
| ***F04D 29/52*** | (2006.01) |
| ***F21V 33/00*** | (2006.01) |
| *F21Y 103/33* | (2016.01) |
| *F21Y 115/10* | (2016.01) |

(52) U.S. Cl.

CPC ....... *F21V 33/0096* (2013.01); *F21Y 2103/33* (2016.08); *F21Y 2115/10* (2016.08)

(56) References Cited

U.S. PATENT DOCUMENTS

| | | | |
|---|---|---|---|
| 10,830,243 | B2 | 11/2020 | Chen |
| 2006/0133920 | A1 | 6/2006 | Chen |
| 2019/0331122 | A1 | 10/2019 | Chen |
| 2020/0240425 | A1 | 7/2020 | Huang et al. |

FOREIGN PATENT DOCUMENTS

| | | | |
|---|---|---|---|
| CN | 103133411 | B | 6/2016 |
| CN | 210397183 | U | 4/2020 |
| CN | 211449119 | U | 9/2020 |
| CN | 214533648 | U | 10/2021 |
| CN | 2014660972 | U | 11/2021 |
| KR | 10-1836161 | B1 | 3/2018 |

OTHER PUBLICATIONS

Xu CN-214660972-U + machine translation (Year: 2021).*

Lee et al KR-101836161-B1 + machine translation (Year: 2018).*

Cooler Master MF120 S2 (https://pcbworldtech.com/product/cooler-master/) 2022.

CORSAIR iCUE QL120 RGB 12cm PWM 風扇(https://www.hkepc.com/19006/%E9%9B%99%E9%9D%A2%E5%9B%9B%E7%92%B034_%E9%A1%86_RGB_LED_CORSAIR_iCUE_QL120_RGB_12cm_PWM_%E9%A2%A8%E6%89%87) 2003-2024 HKEPC Production Co. Ltd.

NZXT RF-AR120-B1 RGB LED Aer RGB120 Advanced RGB LED PWM Fan for HUE (https://www.newegg.ca/nzxt-rf-ar120-b1-case-fan/p/N82E16835146050 2000-2024 Newegg Inc.

European Search Report; dated Apr. 28, 2025; Application # 22937609.0.

* cited by examiner

FAN WITH LIGHTING EFFECT

TECHNICAL FIELD

The present disclosure generally relates to a fan, in particular, a fan with lighting effect.

BACKGROUND

Cooling fans with lighting effect are widely available in the market. However, a cooling fan for electronic devices, for example, a computer, not only has to be functionally effective but also to be attractive in its appearance.

Therefore, there exists a need for fans that have improved lighting effect and more appealing aesthetics.

SUMMARY

According to a first aspect of the present disclosure, a fan with lighting effect is provided. The fan may include a fan blade assembly having a plurality of fan blades rotatable about a rotational axis of the fan blade assembly; a fan frame having a periphery structure radially disposed from the rotational axis to surround the fan blade assembly, the periphery structure having an inner wall and an outer wall defining a slot therebetween, the outer wall being radially farther than the inner wall with respect to the rotational axis, wherein an edge of the inner wall and a corresponding edge of the outer wall defines a slot opening; a light emitting module disposed in the slot and oriented to emit light along a light path non-parallel with the rotational axis of the fan blade; a reflector disposed in the slot and in the light path of the light emitting module for reflecting the light emitted by the light emitting module; and a light guide fitted to the slot in a manner to guide light to exit from the slot via the slot opening.

DETAILED DESCRIPTION

Figure 1:
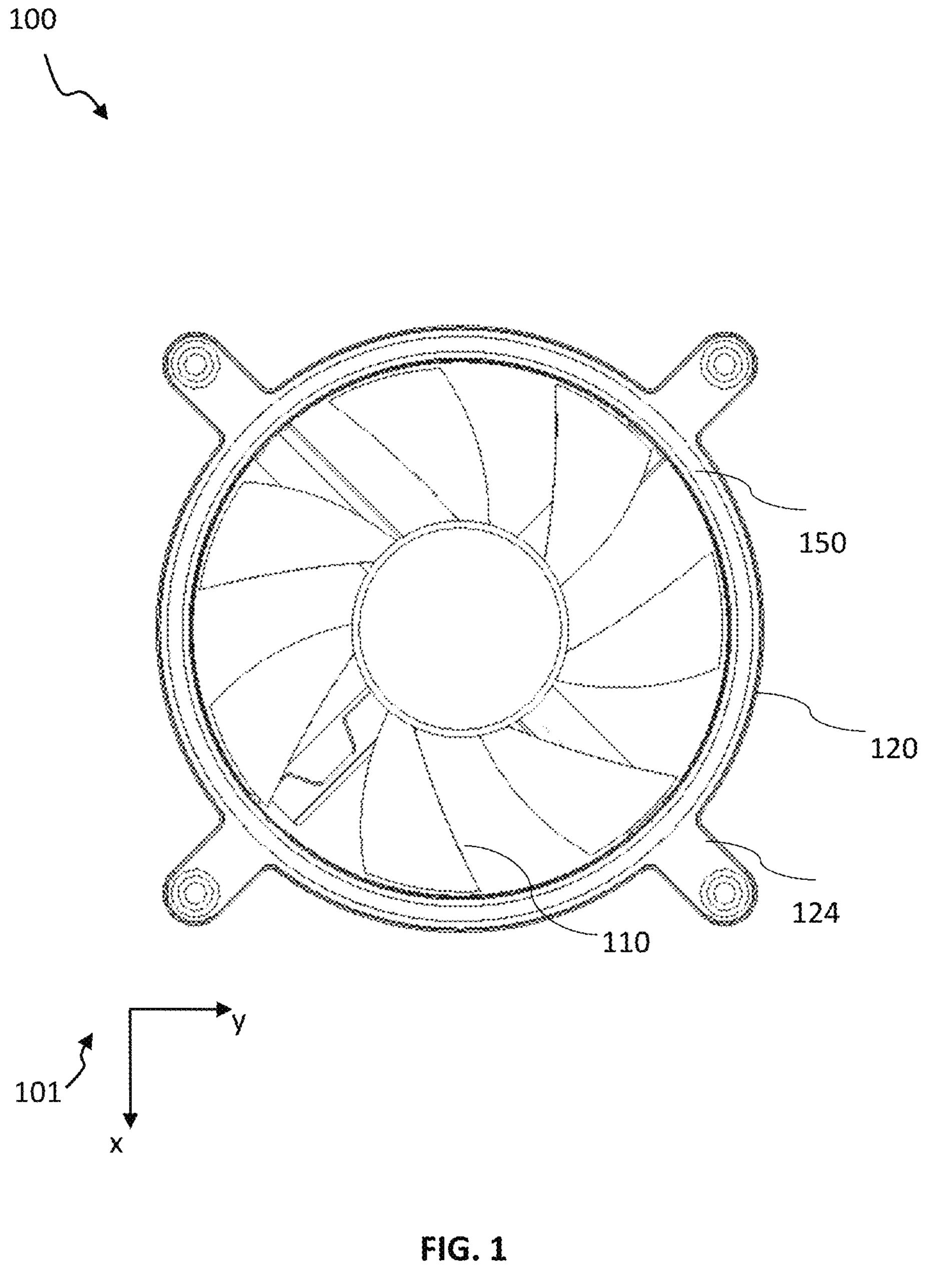
FIG. 1 is a diagram showing a front view of an example fan with lighting effect, according to an embodiment of the present disclosure.

Implementations described below in the context of a device, apparatus, or system are analogously valid for the respective methods, and vice versa. Furthermore, it will be understood that the implementations described below may be combined, for example, a part of one implementation may be combined with a part of another implementation, and a part of one embodiment may be combined with a part of another embodiment.

It should be understood that the terms "on", "over", "top", "bottom", "down", "side", "back", "left", "right", "front", "back", "lateral", "side", "up", "down", "vertical", "horizontal" etc., when used in the following description are used for convenience and to aid understanding of relative positions or directions, and not intended to limit the orientation of any device, or structure or any part of any device or structure. In addition, the singular terms "a", "an", and "the" include plural references unless context clearly indicates otherwise. Similarly, the word "or" is intended to include "and" unless the context clearly indicates otherwise.

It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more steps or elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Approximating language, as used herein throughout the specification and claims, may be applied to modify any quantitative representation that could permissibly vary without resulting in a change in the basic function to which it is related. Accordingly, a value modified by a term or terms, such as "about," "substantially", is not limited to the precise value specified. In some instances, the approximating language may correspond to the precision of an instrument for measuring the value.

Various aspects of what is described here seek to provide a fan with lighting effect, particularly, an axial fan with lighting effect. The proposed fan may include a fan blade assembly having a plurality of fan blades rotatable about a rotational axis of the fan blade assembly. The proposed fan may further include a fan frame having a periphery structure radially disposed from the rotational axis to surround the fan blade assembly, the periphery structure having an inner wall and an outer wall defining a slot therebetween, the outer wall being radially farther than the inner wall with respect to the rotational axis, wherein a (first) edge of the inner wall and a corresponding (first) edge of the outer wall defines a slot opening. The proposed fan may also include a light emitting module disposed in the slot and oriented to emit light along a light path non-parallel with the rotational axis of the fan blade, a reflector disposed in the slot and in the emitting light path of the light emitting module for reflecting the light emitted by the light emitting module, and a light guide fitted to the slot in a manner to guide light to exit from the slot via the slot opening.

According to some aspects, the proposed fan may have at least one light emitting module, for example including one or more LEDs. According to some aspects, the proposed fan may have one or more (or multiple) reflectors disposed in the emitting light path of the light emitting module for reflecting the light emitted by the light emitting module. According to some aspects, the proposed fan may include a single light guide. According to some aspects, the proposed fan may include two light guides where the light emitting module and the reflector are disposes between the two light guides. The fan may produce double-sided and two-ring lighting effect from one light emitting module. According to some aspects, the proposed fan may include two or more light guides fitted to two or more openings of the fan frame.

In some aspects of what is described here, a fan may include a light guide including Y-shape cross-sectional profile. Two branches of the Y-shaped cross-sectional profile may be substantially parallel. A bottom part of the Y-shaped cross-sectional profile may be tapered. The light guide may be fitted to the slot at the slot opening in a manner so as to form a flushed surface extending between the inner and outer walls. Accordingly, the two branches of the light guide provides a larger surface to receive more light and guide the light to exit from the tapered bottom part of the light guide which has a narrower surface exposed and flushed with the walls, thereby focusing the light and thus providing brighter and sleek lighting effect.

In some instances, aspects of the systems and techniques described here provide technical improvements and advantages over existing approaches. For example, the proposed fan may provide an improved lighting/luminous effect at least for the following reasons. The fan frame may be specifically provided with two walls corresponding to each other and a groove/slot between the two walls. The light emitting module, the reflector and the light guide(s) may be arranged in the slot such that the light may be effectively diffused by traveling from the light emitting module, the reflector and the light guide(s) to exit from the slot opening. Accordingly, the light may travel a longer path so as to be sufficiently diffused and the RGB colors may be also well mixed. Therefore, the proposed fan may provide a smooth and velvety lighting effect. Further, various components and features may be provided to reduce luminous loss. The light reflector may be provided to prevent light decay and the white printed circuit board (PCB) of the light module may be also provided reduce light reflective loss. The light guide(s) of special shape and configuration may be also provided to guide light to exit from the fan frame with minimum loss. Therefore, the proposed fan may provide a bright and vivid lighting effect. Moreover, as the light module may be arranged not to directly face towards the exit (the slot opening), light spots may be not obvious or only a few indistinct light spots may be observed when the light is on. Accordingly, the lighting effect of the proposed fan may be smooth and soft.

As a further example, the proposed fan may provide a better aesthetic appearance. Insert molding technology may be used to make the light guide(s) and the fan frame to fit tightly with the fan frame. That is, no gap may exist between the light guide(s) and the fan frame.

Additionally, the light guide(s) may have a narrower surface exposed and flushed between the walls of the fan frame. Accordingly, the proposed fan may give a neat and sleek look with the light guide(s) integrally fit with the fan frame. Also, the fan frame may be hollow with a blackbody cavity effect on absorbing light from the environment. Accordingly, the light guide(s) may look dark when the light is off. As another example, the proposed fan may provide a cost effective solution. The lighting effect on both sides of the fan may be provided by utilizing a single light emitting module and two light guides. Accordingly, the cost may be reduced.

The following examples pertain to various aspects of the present disclosure.

Example 1 is a fan with lighting effect including: a fan blade assembly having a plurality of fan blades rotatable about a rotational axis of the fan blade assembly; a fan frame having a periphery structure radially disposed from the rotational axis to surround the fan blade assembly, the periphery structure having an inner wall and an outer wall defining a slot therebetween, the outer wall being radially farther than the inner wall with respect to the rotational axis, wherein an edge of the inner wall and a corresponding edge of the outer wall defines a slot opening; a light emitting module disposed in the slot and oriented to emit light along a light path non-parallel with the rotational axis of the fan blade; a reflector disposed in the slot and in the light path of the light emitting module for reflecting the light emitted by the light emitting module; and a light guide fitted to the slot in a manner to guide light to exit from the slot via the slot opening.

In Example 2, the subject matter of Example 1 may optionally include an opposite edge of the inner wall and a corresponding opposite edge of the outer wall defines a further slot opening.

In Example 3, the subject matter of Example 2 may optionally include a further light guide fitted to the slot in a manner to guide light to exit from the slot via the further slot opening.

In Example 4, the subject matter of Example 3 may optionally include that the light emitting module and the reflector are between the light guide and the further light guide, and within the slot.

In Example 5, the subject matter of any of Examples 1 to 3 may optionally include that the slot is an annular slot.

In Example 6, the subject matter of any of Examples 1 to 5 may optionally include that the light emitting module comprises a light reflective substrate having a ring shape, wherein the light reflector has a corresponding ring shape, wherein the light emitting module and the light reflector are disposed in a manner such that the light reflective substrate and the light reflector are substantially concentric with each other.

In Example 7, the subject matter of any of Examples 1 to 6 may optionally include that the inner wall is an annular inner wall and the outer wall is an annular outer wall, wherein the annular inner wall and the annular outer wall are arranged in a substantially concentric manner.

In Example 8, the subject matter of any of Examples 1 to 7 may optionally include that the light emitting module and the light reflector are disposed in an opposing manner.

In Example 9, the subject matter of any of Examples 1 to 8 may optionally include that the slot opening lies in a plane substantially perpendicular to the rotational axis of the fan blade assembly.

In Example 10, the subject matter of Example 4 may optionally include that the further slot opening lies in a plane substantially perpendicular to the rotational axis of the fan blade assembly.

In Example 11, the subject matter of any of Examples 1 to 10 may optionally include that the light guide is fitted to the slot at the slot opening in a manner so as to form a flushed surface extending between the edge of the inner wall and the corresponding edge of the outer wall.

In Example 12, the subject matter of Example 4 may optionally include that the further light guide is fitted to the slot at the further slot opening in a manner so as to form a flushed surface extending between the opposite edge of the inner wall and the corresponding opposite edge of the outer wall.

In Example 13, the subject matter of any of Examples 1 to 12 may optionally include that the light guide comprise a Y-shape cross-sectional profile.

In Example 14, the subject matter of Example 13 may optionally include that two branches of the Y-shaped cross-sectional profile are substantially parallel.

In Example 15, the subject matter of Example 13 may optionally include that a bottom part of the Y-shaped cross-sectional profile is tapered.

In Example 16, the subject matter of any of Examples 1 to 15 may optionally include that the light guide abuts an edge of the reflector and an edge of the light emitting module, respectively.

In Example 17, the subject matter of any of Examples 1 to 16 may optionally include that the fan frame comprises four protrusions uniformly distributed around the periphery structure of the fan frame, each protrusion extending radially outwards with respect to the rotational axis of the fan blade assembly.

In Example 18, the subject matter of any of Examples 1 to 17 may optionally include that the light emitting module comprises red, blue and green LEDs.

In Example 19, the subject matter of any of Examples 1 to 18 may optionally include that the light guide is integrally fitted to the slot via insert molding.

In Example 20, the subject matter of Example 4 may optionally include that the further light guide is integrally fitted to the further slot via insert molding.

Figure 2:
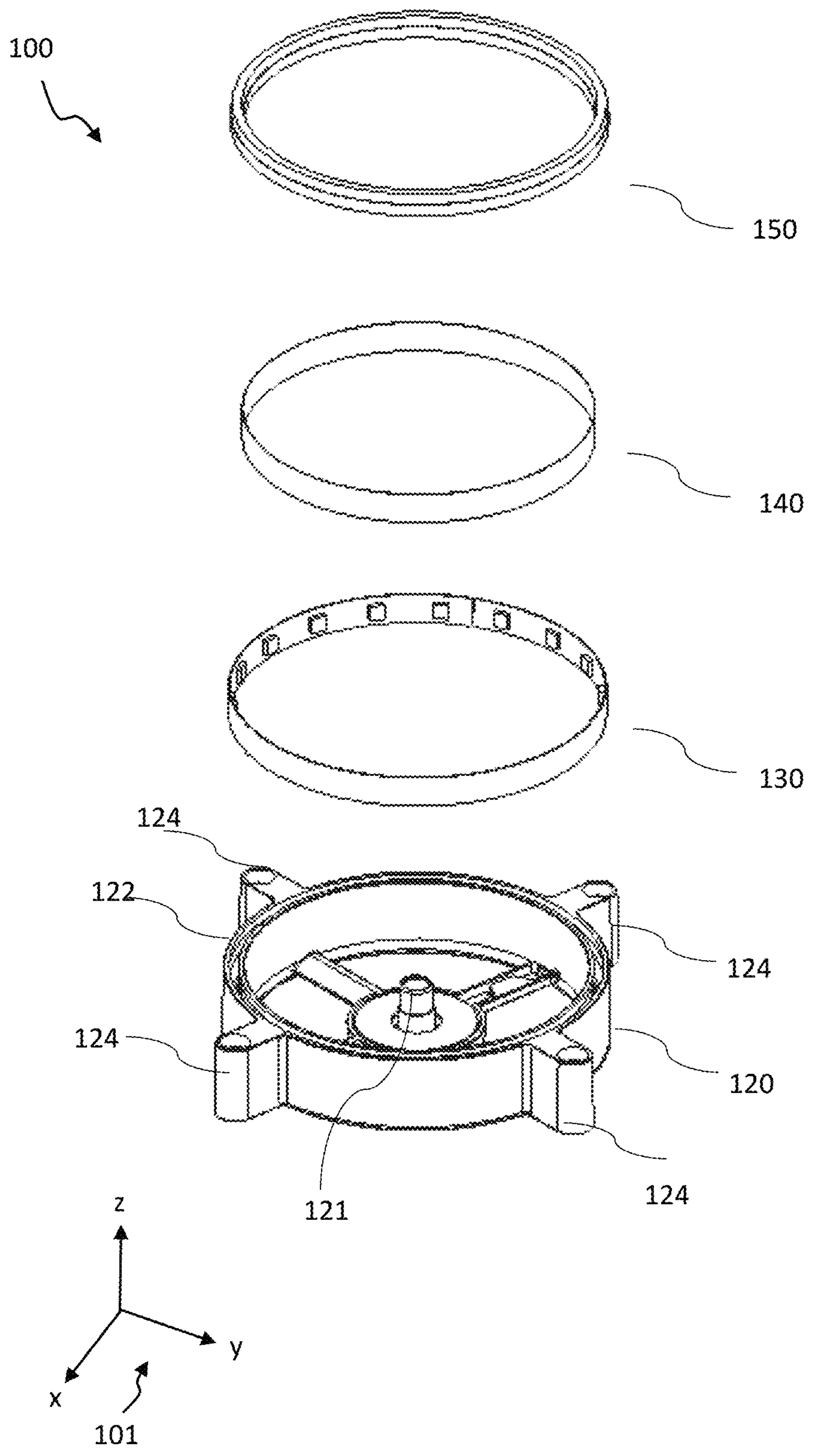
FIG. 2 is a diagram showing an exploded view of the example fan of FIG. 1.
Figure 3A:
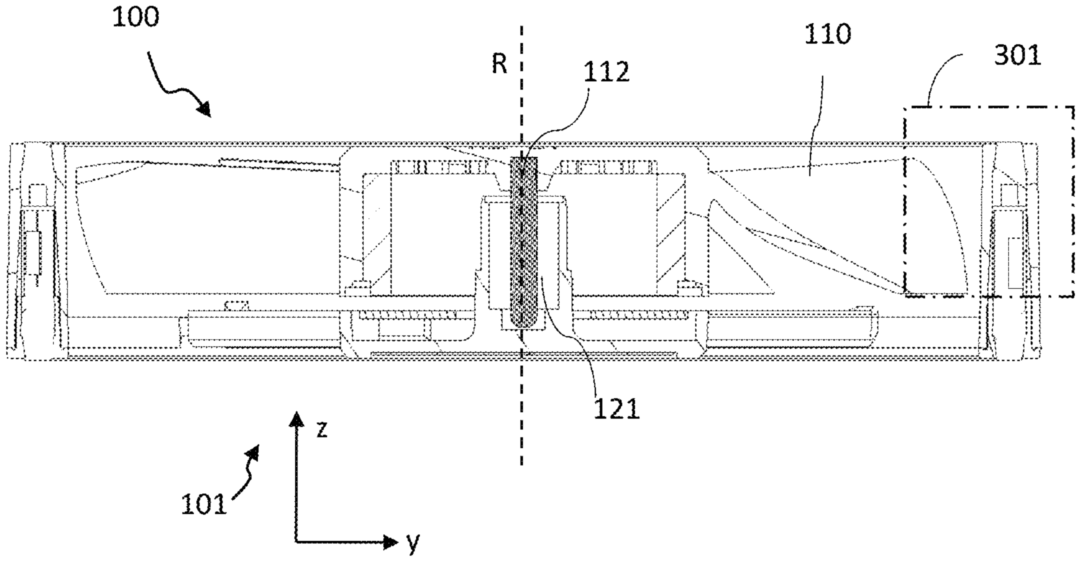
FIG. 3A is a diagram showing a cross-section view of the example fan of FIG. 1.
Figure 3B:
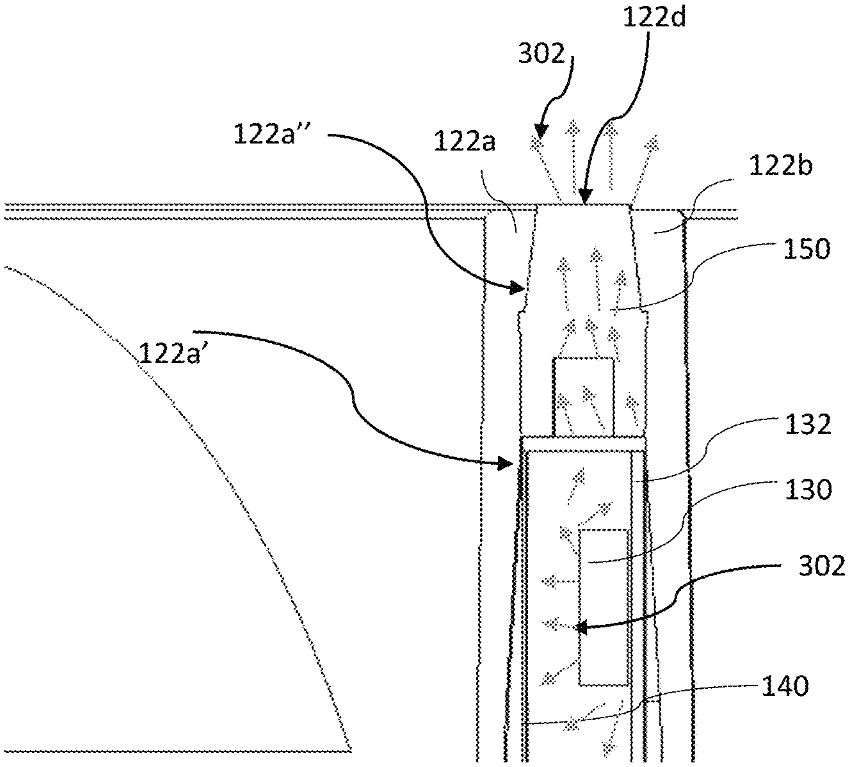
FIG. 3B is a diagram showing a partial enlarged cross-section view of the example fan shown in FIG. 3A.
Figure 3C:
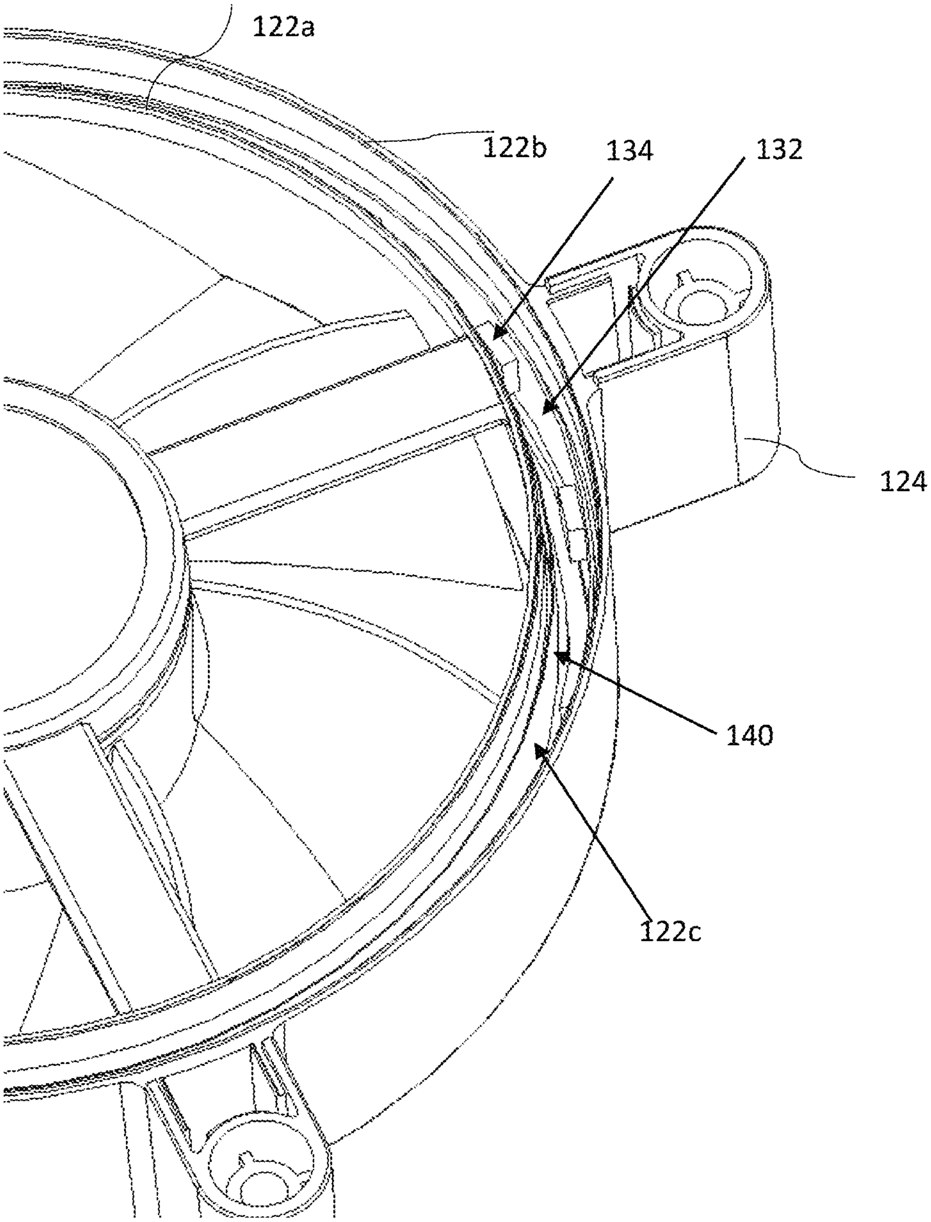
FIG. 3C is a diagram showing a partial perspective view of the example fan of FIG. 1.
Figure 4A:
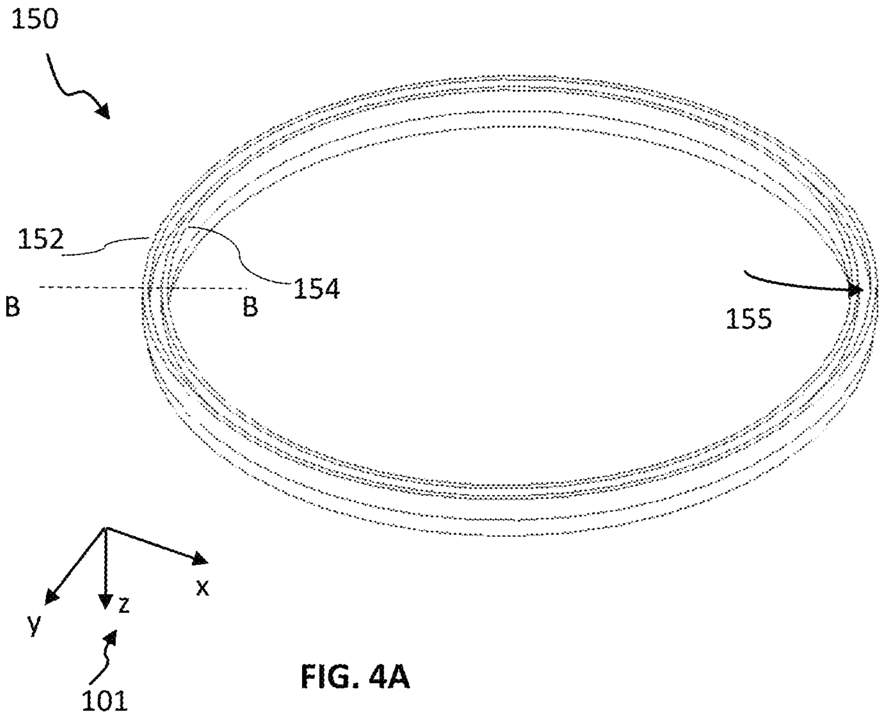
FIG. 4A is a diagram showing a perspective view of a light guide of the example fan of FIG. 1.
Figure 4B:
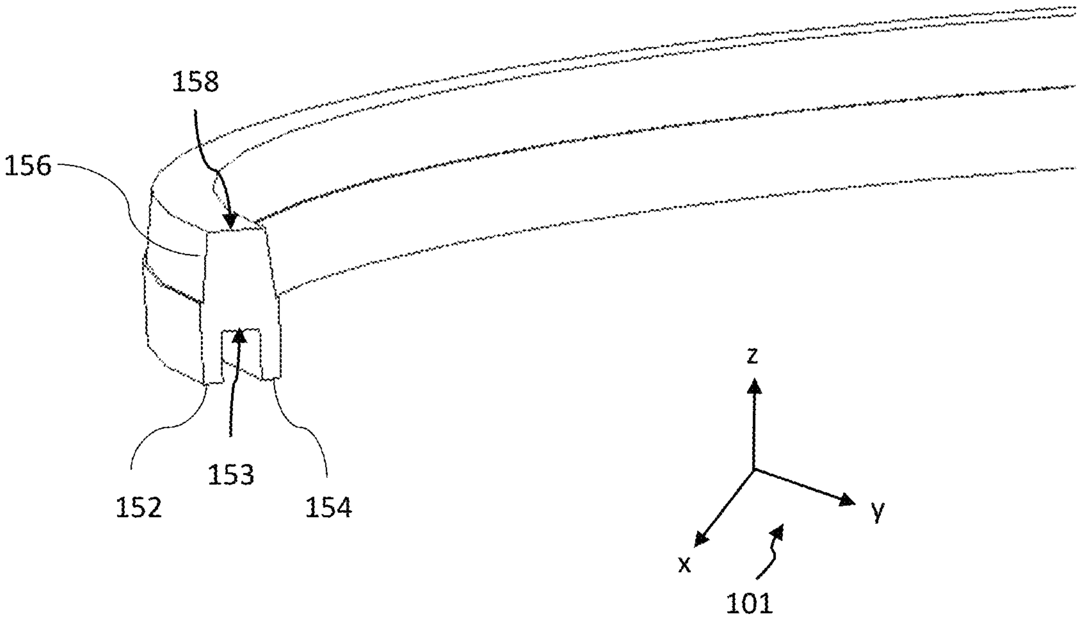
FIG. 4B is a diagram showing a partial enlarged cross-section view of the light guide shown in FIG. 4A.

Referring to FIG. 1 to FIGS. 4A and 4B, FIG. 1 is a front view of a fan 100 with lighting effect according to an embodiment of the present disclosure. FIG. 2 is an exploded view of the fan 100 of FIG. 1. FIG. 3A is a cross-sectional view of the fan 100 of FIG. 1 along the line AA; FIG. 3B is a partial enlarged cross-sectional view of the fan 100 in FIG. 3A as denoted 301; FIG. 3C shows a partial perspective view of the fan 100 of FIG. 1. FIG. 4A shows a perspective view of a light guide 150 of the fan 100 of FIG. 1; FIG. 4B shows a partial enlarged cross-section view of the light guide 150 shown in FIG. 4A along the line BB. The fan 100 is, for example but not limited to, a cooling fan accommodated in a chassis of a personal computer. FIG. 1 to FIGS. 3A and FIGS. 4A and 4B also show a frame of reference 101 having three orthogonal axes. The frame of reference 101 includes a first axis in a first direction (e.g., the X-direction), a second axis in a second direction (e.g., the Y-direction), and a third axis in a third direction (e.g., the Z-direction). The first, second, and third directions are perpendicular to each other.

In the embodiment, the fan 100 may include a fan blade assembly 110, a fan frame 120, a light emitting module 130, a reflector 140, and a light guide 150. The fan blade assembly 110 may include a plurality of fan blades rotatable about a rotational axis of the fan blade assembly 110. The fan 100 may be switched on so that the plurality of fan blades rotates about the rotational axis to provide a cooling effect. The rotational axis may be along the Z-direction. The number of the fan blade is shown as seven in FIG. 1; however, the number of the blades shall not be limited to seven and shall include any number that is applicable, such as four, five or nine. The fan blade assembly 110 is omitted from FIG. 2 to avoid cluttering the figure. The light guide 150 is omitted from FIG. 3C to show the slot 122*c*, the light emitting module 130 and the reflector 140 disposed in the slot 122*c*. The fan frame 120 may include a periphery structure 122 radially disposed from the rotational axis to surround the fan blade assembly 110. The fan blade assembly 100 may be therefore enclosed by the fan frame 120. The fan frame 120 may also include a borehole protrusion 121 disposed along the rotational axis to receive a shaft 112 of the fan blade assembly 110. The fan frame 120 may further include support structures connecting between the borehole protrusion 121 and the periphery structure 122.

Referring to FIGS. 3B and 3C, the periphery structure 122 may include an inner wall 122*a* and an outer wall 122*b* defining a slot 122*c* therebetween. The outer wall 122*b* may be radially farther than the inner wall 122*a* with respect to the rotational axis, wherein a (first) edge of the inner wall 122*a* and a corresponding (first) edge of the outer wall 122*b* defines a slot opening 122*d*. In other words, the outer wall 122*b* may be disposed further than the inner wall 122*a* along the Y-direction as shown in FIGS. 3A and 3B. The (first) edge of the inner wall 122*a* and the corresponding (first) edge of the outer wall 122*b* may be an uppermost end of the inner wall 122*a* and an uppermost end of the outer wall 122*b* along the positive Z-direction as shown in FIGS. 3A and 3B.

The light emitting module 130 may be disposed in the slot 122*c* and oriented to emit light along a light path non-parallel with the rotational axis of the fan blade assembly 110. By non-parallel with the rotational axis, it is intended to include applicable directions that are not parallel to the Z-direction of the frame of reference 101, for example, along the Y-direction, along the X-direction, or any direction having an (non-zero) angle with the Z-direction. The reflector 140 may be disposed in the slot 122*c* and in the emitting light path of the light emitting module 130 for reflecting the light emitted by the light emitting module 130. The reflector 140 may be oriented to face toward the light emitting module 130 so as to redirect the light with minimum loss. The reflector 140 may be properly selected to reflect more light and absorb less light, and not to alter or change the color of the light if desired. The light emitting module and the light reflector may be disposed in an opposing manner. In some implementations, the light emitting module 130 may be disposed in the slot 122*c* along the outer wall 122*b* and the reflector 140 may be disposed in the slot 122*c* along the inner wall 122*a*, whereby the light emitting module 130 is opposite to the reflector 140, in other words, the light emitting module 130 faces the reflector 140. In further implementations, the light emitting module 130 may be disposed in the slot 122*c* along the inner wall 122*a* and the reflector 140 may be disposed in the slot 122*c* along the outer wall 122*b*.

The light emitting module 130 may comprise red, blue and green (RGB) LEDs. The RGB LEDs may be programed to produce different hues of light. The light emitting module 130 may comprise a plurality of light sources 134 uniformly spaced apart from each other along the longitudinal direction thereof. In some implementations, the plurality of light sources 134 may be disposed at a middle region of the light emitting module 130 along the traverse direction thereof. A height of the light emitting module 130 in the Z-direction and a height of the reflector 140 in the Z-direction may be the same in a manner that the light emitted by the lighting emitting module 130 would be effectively reflected and emit from the slot 122*c*. In some implementations, the light emitting module 130 may be disposed in alignment with the reflector 140. A height of one of the plurality of light sources 134 of the light emitting module 130 in the Z-direction and the height of the reflector 140 in the Z-direction may be of a certain ratio in a manner that the light emitted by the lighting emitting module 130 would be effectively reflected and emit from the slot 122*c*. For example, the height of one of the plurality of light sources 134 of the light emitting module 130 in the Z-direction is half of the height of the light emitting module 130 in the Z-direction. For example, the height of one of the plurality of light sources 134 of the light emitting module 130 in the Z-direction is half of the height of the reflector 140 in the Z-direction. A suitable ratio may be obtained from lighting effect simulation.

In some implementations, the slot 122*c* may be an annular slot as shown in FIG. 2. The light emitting module 130 may comprise a light reflective substrate 132 (shown in FIGS. 3B and 3C) having a ring or substantially circular shape. The light emitting module 130 may be formed from a long trip of light emitting module and be bent into the ring or v substantially circular shape. The light reflector 140 may have a corresponding ring or circular shape. The reflector 140 may be also formed from a long trip of light reflector and be bent into the ring or substantially circular shape. The light emitting module 130 and the light reflector 140 may be disposed in a manner such that the light reflective substrate 132 and the light reflector 140 are substantially concentric with each other. In some implementations, as shown in FIGS. 3B and 3C, the inner wall 122*a* may be an annular inner wall and the outer wall 122*b* may be an annular outer wall. The annular inner wall and the annular outer wall may be arranged in a substantially concentric manner while the annular inner wall may have a radial diameter less than that of the annular outer wall. A difference between the radial diameters of the annular inner wall and the annular outer wall may be configured to accommodate the light emitting module 130 and the reflector 140 in a manner that the light emitted by the lighting emitting module 130 would be effectively reflected and emit from the slot 122*c*. It shall be appreciated that although the periphery structure 122 of the fan frame 120 is shown as an annular shape, the shape of the periphery structure 122 and its associated structures including the slot 122*c* are not limited by the annular shape, and on the other hand can include any shape that is applicable, such as oval, polygon and substantially ring shapes. Accordingly, the light emitting module 130 and reflector 140 may be formed in a corresponding shape to fit in the slot 122*c*.

In some implementations, a height of the inner wall 122*a* in the Z-direction and a height of the outer wall 122*b* in the Z-direction may be substantially the same. The height of the inner wall 122*a* in the Z-direction may be larger than the height of the reflector 140 in the Z-direction by a number of times, for example, two times; the height of the outer wall 122*b* in the Z-direction may be larger than the height of the light emitting module 130 in the Z-direction by a different number of time, for example, two times. The heights of the structures (e.g. the light emitting module 130, the reflector 140, and the light guide 150) as well as the heights of the walls may be adjusted according to characteristics of the fan blade assembly 110 including fan blades, fan motor, fan performance design target and the lighting effect simulation.

In some implementations, the inner wall 122*a* may include an interior surface, and a middle portion 122*a*' of the interior surface may be substantially vertical or cylindrical to accommodate the light reflector 140. An end portion 122*a*" of the interior surface of the inner wall 122*a* may extend from the middle portion 122*a*' and be sloping or tapered from the middle portion 122*a*' to the slot opening 122*d*. The outer wall 122*b* may also include an interior surface, and a corresponding middle portion of the interior surface may be substantially vertical or cylindrical to accommodate the light emitting module 130. A corresponding end portion of the interior surface of the outer wall 122*b* may extend from the corresponding middle portion and be sloping or tapered from the corresponding middle portion to the slot opening 122*d*.

In some implementations, the slot opening 122*d* may lie in a plane substantially perpendicular to the rotational axis of the fan blade assembly, that is, lie in the X-Y plane. A width of the slot opening 122*d* may be configured in a manner that the light emitted by the lighting emitting module 130 would be effectively reflected and emit from the slot 122*c*. In some implementations, the light guide 150 may be fitted to the slot 122*c* at the slot opening 122*d* in a manner so as to form a flushed surface extending between the (first) edge of the inner wall 122*a* and the corresponding (first) edge of the outer wall 122*b*. Stated differently, the light guide 150 together with the (first) edges of the walls 122*a*, 122*b* forms a flat surface. The light guide 150 may be fitted to the slot 122*c* in a manner to guide light to exit from the slot 122*c* via the slot opening 122*d*. The light guide 150 may be integrally fitted to the slot 122*c* via insert molding so that the light guide 150 fits closely with the walls 122*a*, 122*b*, whereby all light exits from the light guide 150.

FIG. 4A depicts a perspective view of the light guide 150 according to an embodiment of the present disclosure; FIG. 4B depicts a partial cross-section view of the light guide 150 of FIG. 4A along the line BB. The light guide 150 may be used to transport light with minimal loss from the light emitting module 130 to the slot opening 122*d* where the light exits. The light is transmitted through the light guide 150 by means of total internal reflection. The light guide 150 may be made of optical grade materials such as acrylic resin, polycarbonate, epoxies, and glass.

Referring to FIGS. 4A and 4B, in some implementations, the light guide 150 may be in an annular (or ring) shape, with two opposite annular surfaces forming a top surface 158 and an underneath surface 153. The light guide 150 may further comprise an inner rim 154 and an outer rim 152 extending from the underneath surface 153, and an annular groove 155 defined by the inner and outer rims 152, 154 and being recessed into the underneath annular surface 153. Now referring to FIG. 4B, the light guide 150 may comprise a Y-shape cross-sectional profile. Two branches (rims) 152, 154 of the Y-shaped cross-sectional profile may be substantially parallel. Two opposing side surfaces of the branches 152, 154, toward the groove 155, and the underneath surface 153 provide a larger surface to capture light rays emitted by the light emitting module 130 disposed adjacent to the two branches 152, 154 of the light guide 150, thereby reducing decay of illuminance. Accordingly, the two branches 152, 154 of the light guide 150 are able to capture more light rays with various angles of incidence. A bottom part 156 of the Y-shaped cross-sectional profile may be tapered. Accordingly, the light is focused and emitted from a bottom surface 158, which is narrower, of the bottom part 156 of the light guide 150. The light guide 150 may abut a (first) edge of the reflector 140 and a (first) edge of the light emitting module 130, respectively, as shown in FIG. 3B. Accordingly, a continuous reflective surface may be provided by the connection of the reflector 140 and the branch 152, and a further continuous reflective surface may be provided by the connection of the light emitting module 130 (i.e. the light reflective substrate 132) and the branch 154 of the light guide 150. Therefore, the light guide 150 captures more light rays emitted from the light emitting module 130, light rays reflected by the reflector 140 and light rays reflected by the light reflective substrate 132 of the light emitting module 130; that is, less light rays are absorbed by the walls 122*a*, 122*b*. The shape of light guide may be configured so as to reduce travel path of the light in the light guide 150, thereby reducing the energy absorbed by the light guide 150. Additionally, the shape of light guide 150 may be configured so as to have better lighting effect taken into consideration of the travel path of the light within the light guide 150.

An exemplary light travel path is indicated by grey arrows 302 as shown in FIG. 3B. Light emitted from the light emitting module 130 is reflected by both the reflector 140 and the light reflective substrate 132 of the light emitting module 130, travels into the light guide 150 and then exits from the bottom surface 158 of the light guide 150 in the slot opening 122*d*, thereby forming an annular lighting effect at the front of the fan 110. The light guide 150 is taped at the slot opening 122*d* so as to focus the light and form brighter annular light.

Various modifications can be made to the fan 100 as described herein. Similar modifications as those described with reference to fan 100 may be made to fan 500 as described below.

Figure 4C:
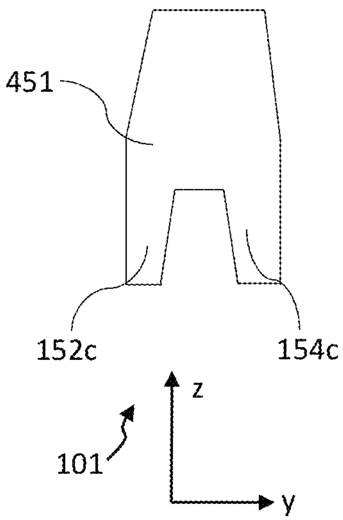
FIGS. 4C to 4L are diagrams showing cross-section views of the light guide shown in FIG. 4A according to various non-limiting implementations.
Figure 4F:
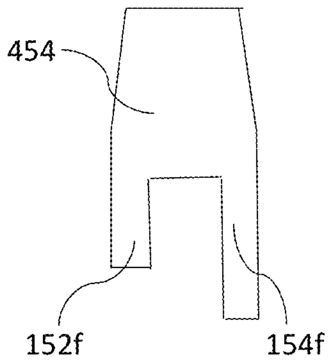
Figure 4D:
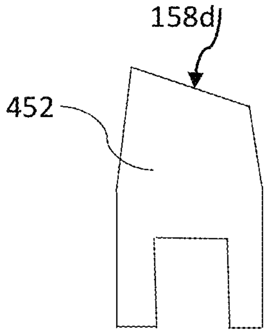
Figure 4G:
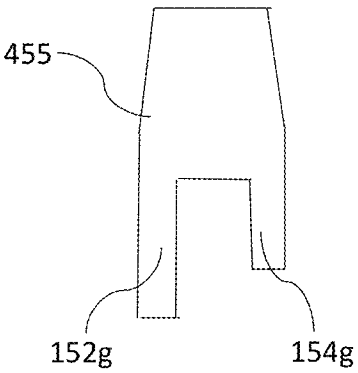
Figure 4E:
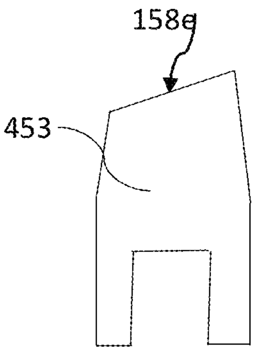
Figure 4H:
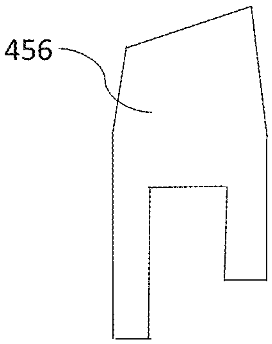
Figure 4I:
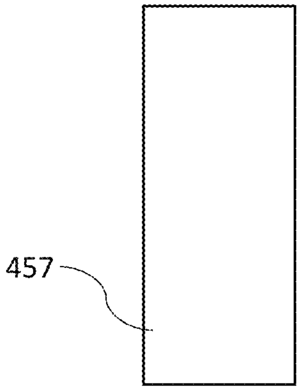
Figure 4K:
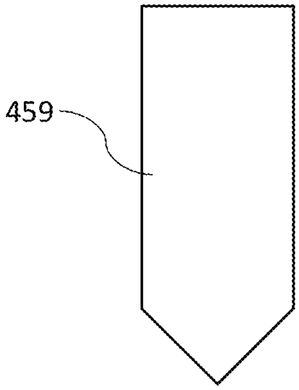
Figure 4J:
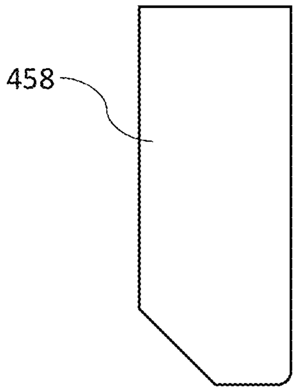
Figure 4L:
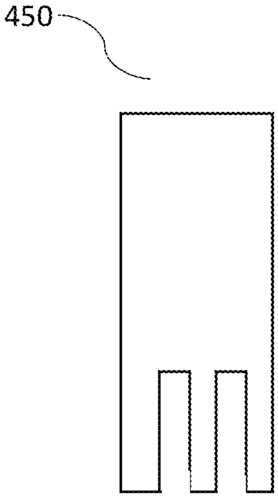

FIGS. 4C to 4L show cross-section views of various modifications 451, 452, 453, 454, 455, 456, 457, 458, 459, 450 of the light guide 150 according to various non-limiting implementations. For example, the length of the inner wall 122*a* may be larger than the length of the outer wall 122*b*, and the bottom surface 158*d* of the light guide 452 may be correspondingly sloped as shown in FIG. 4D so as to form a flushed surface extending between the walls 122*a*, 122*b*. Similarly, the length of the inner wall 122*a* may be less than the length of the outer wall 122*b*, and the bottom surface 158*e* of the light guide 453 may be correspondingly sloped as shown in FIG. 4E so as to form a flushed surface extending between the walls 122*a*, 122*b*. In some implementations, a cross-section view of the two branches 152*c*, 154*d* of the light guide 451 may be trapezoid as shown in FIG. 4C so as to adjust incident angles of the light. In some implementations, the height of the light emitting module 130 in the Z-direction may be less than the height of the reflector 140 in the Z-direction, the branch 154*f* of the light guide 454 may extend further than the branch 152*f* of the light guide 454, as shown in FIG. 4F so as to abut the corresponding (first) edge of the light emitting module 130 while the branch 152*f* abuts the corresponding (first) edge of the reflector 140. Similarly, the length of the light emitting module 130 in the Z-direction may be larger than the length of the reflector 140 in the Z-direction, the branch 154*g* of the light guide 455 may extend less than the branch 152*g* of the light guide 455, as shown in FIG. 4G so as to abut the corresponding (first) edge of the light emitting module 130 while the branch 152*g* abuts the corresponding (first) edge of the reflector 140. In some implementations, a combination of the above variation, e.g. the light guide 456, may be possible as shown in FIG. 4H, as an example. In some implementations, other shape and configuration 457, 458, 459, 460, of the light guide 150 may be configured as shown in FIGS. 4I to 4L in accordance with lighting effect simulation.

Taken into consideration of the rules of reflection of light, the dimensions of various structures of the fan frame 120, such as the heights of the walls in the Z-direction, the width of the slot opening 122*d*, the distance between the walls, may be configured to accommodate the dimensions of the light emitting module 130, the reflector 140 and the light guide 150, so that the light emitted by the light emitting module 130 is effectively reflected and emit from the slot 122*c*.

Referring back to FIG. 1, in some implementations, the fan frame 120 may comprise four protrusions 124 uniformly distributed around the periphery structure 122 of the fan frame 120, each protrusion 124 extending radially outwards with respect to the rotational axis of the fan blade assembly 110. Each protrusion 124 may include a through hole to receive a fixing means for installing the fan 110 to an electronic device.

The fan blade assembly 110 and the fan frame 120 may be made of a same material, for example, an opaque material. The fan blade assembly 110 and the fan frame 120 may also be made of a different material.

Figure 5:
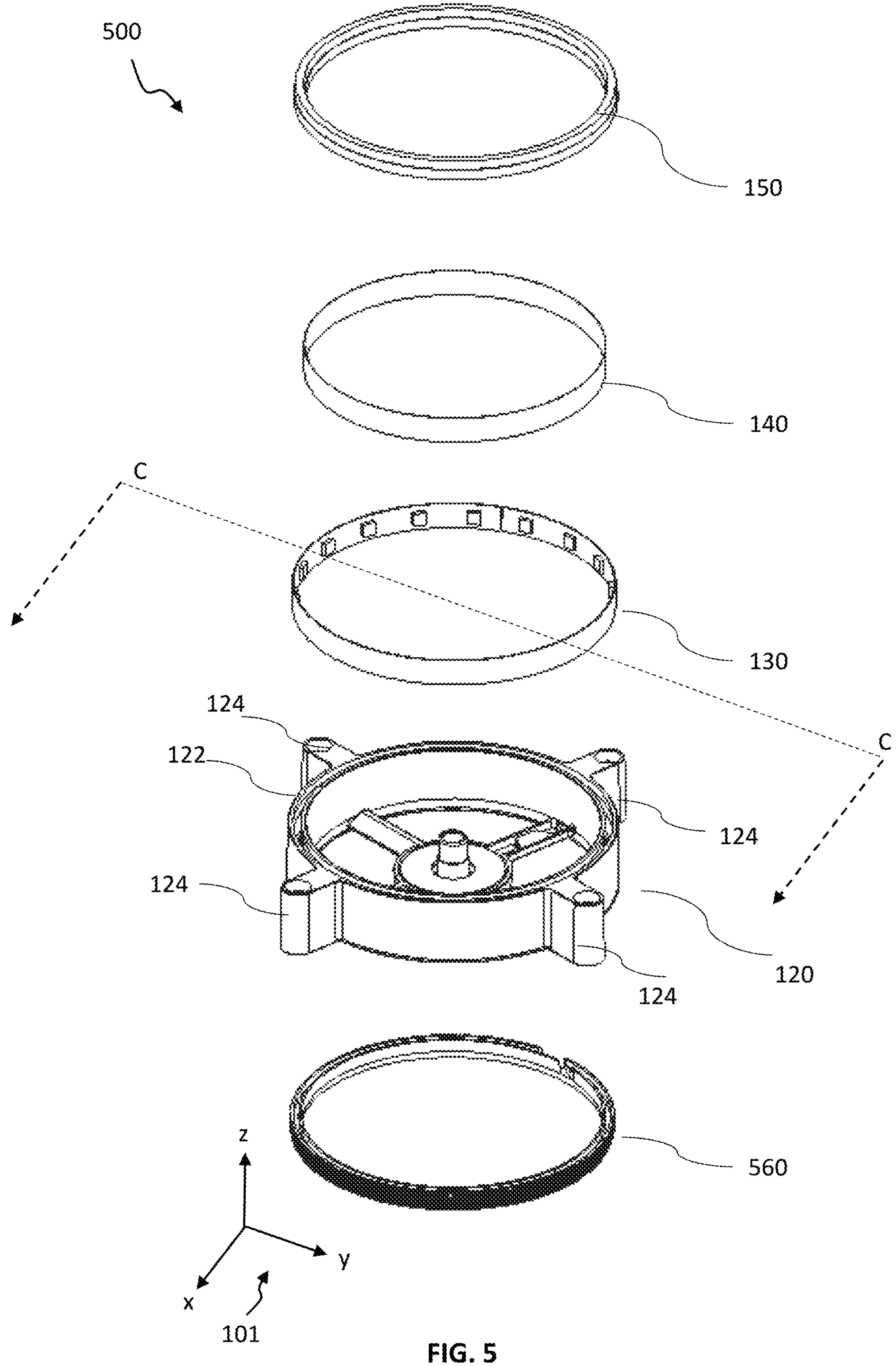
FIG. 5 is a diagram showing an exploded view of an example fan with lighting effect, according to another embodiment of the present disclosure.
Figure 6A:
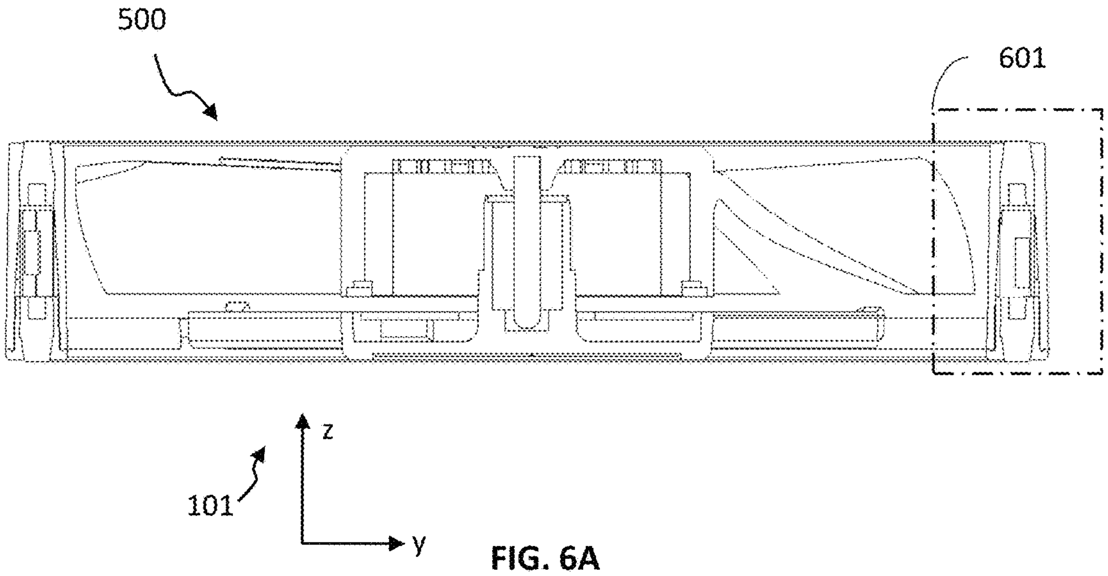
FIG. 6A is a diagram showing a cross-section view of the example fan of FIG. 5.
Figure 6B:
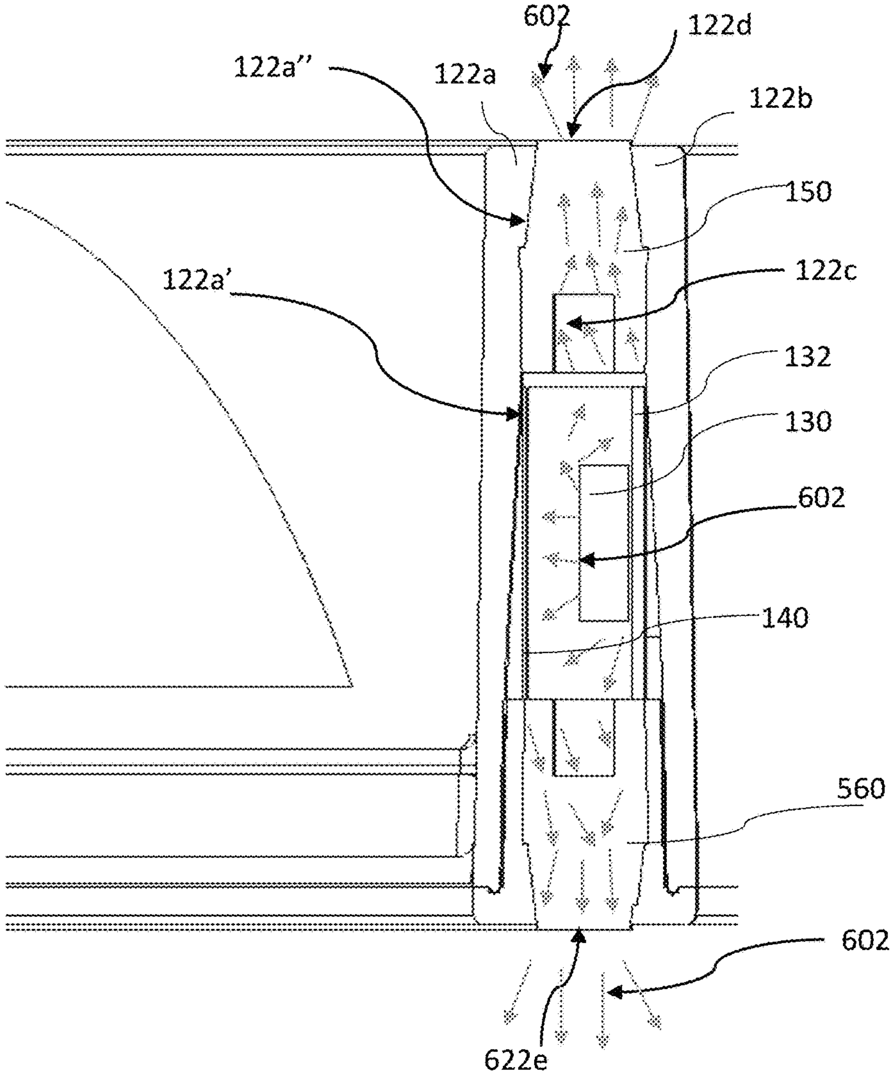
FIG. 6B is a diagram showing a partial enlarged cross-section view of the example fan shown in FIG. 6A.

FIG. 5 is an exploded view of a fan 500 with lighting effect according to another embodiment of the present disclosure. FIG. 6A is a cross-sectional view of the fan 500 of FIG. 5 along the line CC; FIG. 6B is a partial enlarged cross-sectional view of the fan 500 in FIG. 6A as denoted 601. The fan 500 may include the features of the fan 100 as described above in connection to FIGS. 1 to 4A, 4B, and therefore, the common features are labelled with the same reference numerals and need not be discussed.

In some implementations, the fan 500 may further include a further light guide 560 disposed on a back side of the fan 500 whereas the light guide 150 is disposed on the front side of the fan 500. The further light guide 560 may have a similar shape and configuration to the light guide 150. An opposite (second) edge of the inner wall 122*a* and a corresponding opposite (second) edge of the outer wall 122*b* may form a further slot opening 622*e*. The opposite (second) edge of the inner wall 122*a* and the corresponding opposite (second) edge of the outer wall 122*b* may be a lowermost end of the inner wall 122*a* and a lowermost end of the outer wall 122*b* along the negative Z-direction as shown in FIG. 6B. The further light guide 560 may be fitted to the slot 122*c*, in a similar manner as the light guide 150 fitted to the slot 122*c*, to guide light to exit from the slot 122*c* via the further slot opening 622*e*. The further slot opening 622*e* may lie in a plane substantially perpendicular to the rotational axis of the fan blade assembly 110. In other words, the further slot opening 622*e* may lie in the X-Y plane. Accordingly, the slot opening 122*d* is parallel to the further slot opening 622*e*. The light emitting module 130 and the reflector 140 may be between the light guide 150 and the further light guide 560, and within the slot 122*c*. The further light guide 560 is fitted to the slot 122*c* at the further slot opening 622*e* in a manner so as to form a flushed surface extending between the opposite (second) edge of the inner wall 122*a* and the corresponding opposite (second) edge of the outer wall 122*b*. The further light guide 560 may be integrally fitted to the slot 122*c* via insert molding.

In some implementations, the further light guide 560 may abut an opposite (second) edge of the reflector 140 and an opposite (second) edge of the light emitting module 130, respectively, as shown in FIG. 6B. This is to prevent light rays emitted by the lighting emitting module 130 from absorbing by the walls 122*a*, 122*b*, of the fan frame 120. Accordingly, a height of the light guide 150, a height of the further light guide 560, the height of the reflector may sum to the height of the inner wall 122*a* of the fan frame 120. The height of the light guide 150, the height of the further light guide 560, the height of the light emitting module 130 may sum to the height of the outer wall 122*b* of the fan frame 120. Therefore, the further light guide 560 is configured to receive more light rays emitted from the light emitting module 130, light rays reflected by the reflector 140 and light rays reflected by the light reflective substrate 132 of the light emitting module 130. The further light guide 560 may be modified as the light guide 150 as shown above with reference to FIGS. 4C to 4L in various implementations.

Light emitted from the light emitting module 130 is reflected by both the reflector 140 and the light reflective substrate 132 of the light emitting module 130, travels into the light guides 150, 560 and then exits from the slot openings 122*d*, 622*e*, thereby forming two annular lighting effects at both the front and back of the fan 110. An exemplary light travel path is indicated by grey arrows 602, as shown in FIG. 6B. Accordingly, a single light emitting module generates two light rays and therefore provides two separate lighting effect.

Various aspects of what is described here have provided a fan with improved performance, better appearance and less costs.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

Some of the operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple implementations separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of implementations have been described. Nevertheless, it will be understood that various modifications can be made. Accordingly, other implementations are within the scope of the following claims.

What is claimed is:

1. A fan with lighting effect, comprising:

a fan blade assembly having a plurality of fan blades rotatable about a rotational axis of the fan blade assembly;

a fan frame having a periphery structure radially disposed from the rotational axis to surround the fan blade assembly, the periphery structure having an inner wall and an outer wall defining a slot therebetween, the outer wall being radially farther than the inner wall with respect to the rotational axis, wherein an edge of the inner wall and a corresponding edge of the outer wall defines a slot opening;

a light emitting module disposed in the slot and oriented to emit light along a light path non-parallel with the rotational axis of the fan blade;

a reflector disposed in the slot and in the light path of the light emitting module for reflecting the light emitted by the light emitting module; and a light guide fitted to the slot in a manner to guide light to exit from the slot via the slot opening, wherein the light guide abuts an edge of the reflector and an edge of the light emitting module, respectively.

2. The fan of claim 1, wherein an opposite edge of the inner wall and a corresponding opposite edge of the outer wall defines a further slot opening.

3. The fan of claim 2, comprising a further light guide fitted to the slot in a manner to guide light to exit from the slot via the further slot opening.

4. The fan of claim 3, wherein the light emitting module and the reflector are between the light guide and the further light guide, and within the slot.

5. The fan of claim 4, wherein the further slot opening lies in a plane substantially perpendicular to the rotational axis of the fan blade assembly.

6. The fan of claim 4, wherein the further light guide is fitted to the slot at the further slot opening in a manner so as to form a flushed surface extending between the opposite edge of the inner wall and the corresponding opposite edge of the outer wall.

7. The fan of claim 4, wherein the further light guide is integrally fitted to the further slot via insert molding.

8. The fan of claim 1, wherein the slot is an annular slot.

9. The fan of claim 8, wherein the light emitting module comprises a light reflective substrate having a ring shape, wherein the light reflector has a corresponding ring shape, wherein the light emitting module and the light reflector are disposed in a manner such that the light reflective substrate and the light reflector are substantially concentric with each other.

10. The fan of claim 1, wherein the inner wall is an annular inner wall and the outer wall is an annular outer wall, wherein the annular inner wall and the annular outer wall are arranged in a substantially concentric manner.

11. The fan of claim 1, wherein the light emitting module and the light reflector are disposed in an opposing manner.

12. The fan of claim 1, wherein the slot opening lies in a plane substantially perpendicular to the rotational axis of the fan blade assembly.

13. The fan of claim 1, wherein the light guide is fitted to the slot at the slot opening in a manner so as to form a flushed surface extending between the edge of the inner wall and the corresponding edge of the outer wall.

14. The fan of claim 1, wherein the light guide comprise a Y-shape cross-sectional profile.

15. The fan of claim 14, wherein two branches of the Y-shaped cross-sectional profile are substantially parallel.

16. The fan of claim 14, wherein a bottom part of the Y-shaped cross-sectional profile is tapered.

17. The fan of claim 1, wherein the fan frame comprises four protrusions uniformly distributed around the periphery structure of the fan frame, each protrusion extending radially outwards with respect to the rotational axis of the fan blade assembly.

18. The fan of claim 1, wherein the light emitting module comprises red, blue and green LEDs.

19. The fan of claim 1, wherein the light guide is integrally fitted to the slot via insert molding.

* * * * *